United States Patent [19]

Baker et al.

[11] Patent Number: 5,204,179
[45] Date of Patent: Apr. 20, 1993

[54] MULTILAYERED POLYOLEFIN STRUCTURE

[75] Inventors: Philip S. Baker, Fairport; Daniel L. Donk, Phelps, both of N.Y.

[73] Assignee: Mobil Oil Corporation, Fairfax, Va.

[21] Appl. No.: 678,880

[22] Filed: Mar. 29, 1991

[51] Int. Cl.$^5$ ............................................. B32B 5/16
[52] U.S. Cl. .................................... 428/336; 428/516; 428/910; 156/244.11
[58] Field of Search ................ 428/516, 35.7, 910, 428/336; 156/244.11

[56] References Cited

U.S. PATENT DOCUMENTS

| | | | |
|---|---|---|---|
| 3,139,412 | 6/1964 | Sterling | 260/23 |
| 3,157,614 | 11/1964 | Fischer | 260/41 |
| 3,553,158 | 1/1971 | Gilfillan | 260/41 |
| 4,252,851 | 2/1981 | Lansbury et al. | 428/516 |
| 4,256,687 | 3/1981 | Yazaki et al. | 264/210.1 |
| 4,259,412 | 3/1981 | Buzio et al. | 428/516 |
| 4,262,051 | 4/1981 | Welz et al. | 428/337 |
| 4,447,479 | 5/1984 | Harrison et al. | 428/35 |
| 4,578,296 | 3/1986 | Miyazaki et al. | 428/35 |

FOREIGN PATENT DOCUMENTS 228041 12/1986 European Pat. Off. .
51-75761 6/1976 Japan .

*Primary Examiner*—Edith Buffalow
*Attorney, Agent, or Firm*—Alexander J. McKillop; Charles J. Speciale

[57] ABSTRACT

A multilayer structure designed to overcome the shortcomings of previously known thermoformed sheet structures. Articles may be formed by a method of the present invention having an attractive outer appearance associated with polyolefin films containing inert inorganic fillers while having the advantageous processing properties of oriented films. The present invention is directed to multilayer structures, methods for forming the multilayer structures as well as shaped articles formed from the multilayer structures. The multilayer structure has at least a first sheet layer comprising a polyolefin and preferably an inert organic filler, and a film layer which advantageously comprises an oriented polyolefin or polyester. The present invention may comprise one or more of each of the above described sheet and film layers.

40 Claims, 1 Drawing Sheet

MULTILAYERED POLYOLEFIN STRUCTURE

The present invention is directed to a multilayer structure comprising at least one polyolefin layer preferably comprising an inorganic filler and, more particularly, to a multilayer structure and process for forming that structure comprising a polyolefin layer, preferably comprising an inorganic filler material, and a second layer comprising an oriented polyolefin or polyester.

BACKGROUND OF THE INVENTION

The use of inorganic fillers to improve certain properties of products is known in the art. For example inert inorganic fillers such as clay, talc, asbestos fibers, silica, barium sulfate and calcium carbonate have been used with polyolefins in caulking and sealing compounds. The use of these inert inorganic fillers has also been taught to be useful for increasing the dielectric strength of non-elastomeric thermoplastic materials.

The use of polyolefins in forming sheet material is also known. Thermoplastic material which has been extruded into sheets has been found suitable for subsequent thermoforming into various types of products such as containers. The use of thermoplastic materials in forming such products has been found to be desirable from a manufacturing and expense perspective. Known materials, however, suffer from the problem of sagging when they are thermoformed as wide sheets. Furthermore, some known materials have lacked consumer appeal due to their appearance such as having a low gloss when formed into final products.

It would, therefore, be desirable to provide a thermoplastic sheet capable of thermoforming into end products such as containers, cups, trays, and the like, having an increased resistance to sagging while providing a finished surface having an attractive high gloss. The reduction of sheet sag allows for better process control and for wider sheets to be used which means more parts/min. and improved manufacturing economics.

SUMMARY OF THE INVENTION

The present invention comprises a multilayer structure designed to overcome the shortcomings of previously known extruded sheet structures. Articles may be formed by a method of the present invention having an attractive outer appearance associated with polyolefin sheets containing inert inorganic fillers while having the advantageous processing properties of oriented films. The present invention is directed to multilayer structures, methods for forming the multilayer structures, as well as shaped articles formed from the multilayer structures. The multilayer structure has at least a first sheet layer, preferably comprising a polyolefin with an inert organic filler, and a second layer, referred to herein as a film layer, which advantageously comprises an oriented polyolefin or polyester. The present invention may comprise one or more of each of the above described sheet and film layers.

DETAILED DESCRIPTION

Figure 1:
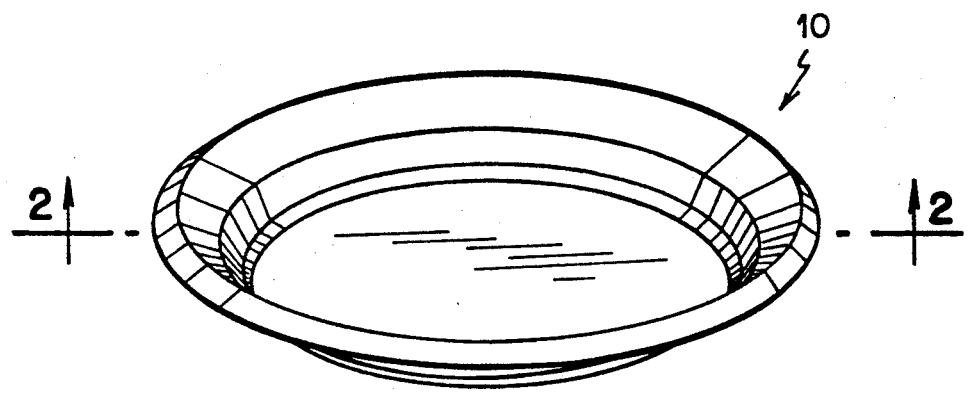
FIG. 1 is a perspective view of a thermoformed multilayer structure of one embodiment of the present invention.

The present invention overcomes shortcomings of the known thermoplastic sheets by reducing the sagging which tends to occur during extruding, while providing a finished end product having a high gloss. The present invention comprises a polyolefin multilayer structure having at least one layer which preferably comprises an inert inorganic filler material and another layer comprising an oriented polyolefin or polyester. In order to efficiently manufacture thermoplastic sheet material which is useful in the subsequent thermoforming of articles such as cups, dishes and plates and other containers, it is desirable to extrude the sheet material in the form of wide sheets. In a practical manufacturing environment, in order to thermoform relatively wide sheets of thermoplastic material, e.g. 24 inches and more preferably 40 inches and wider, it is necessary to work with a material which does not have a great tendency to sag. The present invention significantly reduces the tendency for a polyolefin sheet material to sag by including at least one layer of an oriented polyolefin or polyester in the sheet.

One preferred embodiment of the present invention comprises a first sheet comprising a polyolefin and an inert inorganic filler. This first sheet of one preferred embodiment of the present invention has a thickness of about 1-50 mils., most preferably around 25 mils. and comprises a homopolymer of polypropylene and, an inert inorganic filler, such as talc. The polyolefin is preferably present in an amount of at least 40%, most preferably around 60%, while the filler may be present in an amount of up to about 60%, most preferably about 40%.

The inert inorganic filler material of the present invention may comprise any known suitable inorganic material such as talc, calcium carbonate, dolomite, kaolin, gypsum or blends thereof.

The polyolefin is preferably a homopolymer such as a polypropylene homopolymer or a polyethylene homopolymer. Other suitable polyolefins include polymers such as copolymers of polypropylene and copolymers of polyethylene.

The present invention also comprises a film layer, preferably having a thickness of about 0.5 to 2.5 mils., most preferably about 1-2 mils., formed of a homopolymer such as an oriented or biaxially-oriented polypropylene homopolymer or polyester. The film layer provides two advantages. First, since the film is an oriented film, most preferably a biaxially oriented film, it inherently has less of a tendency to sag and, therefore, when it is laminated to the first sheet, a multilayer structure is provided having less of a tendency to sag. Secondly, it has been found that by providing the multilayer structure of the present invention with a thin film of an oriented homopolymer, the finished articles are provided with an attractive gloss which would not be obtained without the use of the film layer. Furthermore, the film layer advantageously acts as a barrier and retains any undesirable materials, such as processing additives or inks, away from foodstuffs which may be placed on top of the film layer in the finished particle. Those skilled in the art will appreciate that by placing a barrier layer over the one or more sublayers of the multilayer structure of present invention, the manufacturer will enjoy greater flexibility when choosing materials such as inks and other additives for this product.

While the preferred material for the film of the present invention is a biaxially oriented polypropylene homopolymer, other oriented polyolefins or polyesters may also be used including polyethylene terephthylate.

The first sheet and the film of the present invention may be joined in any conventional manner. For example, the oriented film may be laminated onto the first sheet shortly after the first sheet leaves the extrusion die and before the first sheet has totally cooled. Alternatively, the sheet and the film may be simultaneously passed through the nip of a chill roll stack at a temperature, pressure, and feed rate sufficient to permanently bond these two layers.

While the present invention comprises at least two layers, the present invention is not limited to two layers. For example, a multilayered structure may be formed with three layers having an inner sheet comprising a polyolefin homopolymer, with an inert inorganic filler, sandwiched between two films each comprising an oriented homopolymer. Those skilled in the art will appreciate that other variations of multilayered structures utilizing a sheet and film as described herein may also be formed.

The multilayered structure of the present invention may be formed into a wide variety of useful articles, such as containers, drinking cups, bowls, and dishes, using conventional thermoforming methods. For example, a 12 ounce bowl may be formed by subjecting the multilayered laminar structure of the present invention to the proper thermoforming temperatures, e.g. about 300°-900° F., and pressures, e.g. about 40-60 psi.

Figure 2:
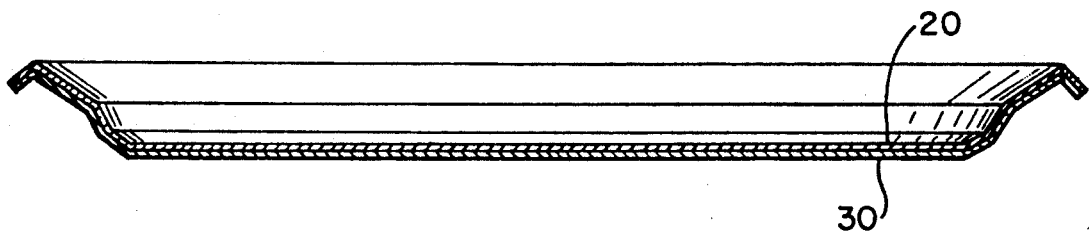
FIG. 2 is a cross-sectional view of the structure illustrated in FIG. 1 taken along lines 2—2.
Figure 3:
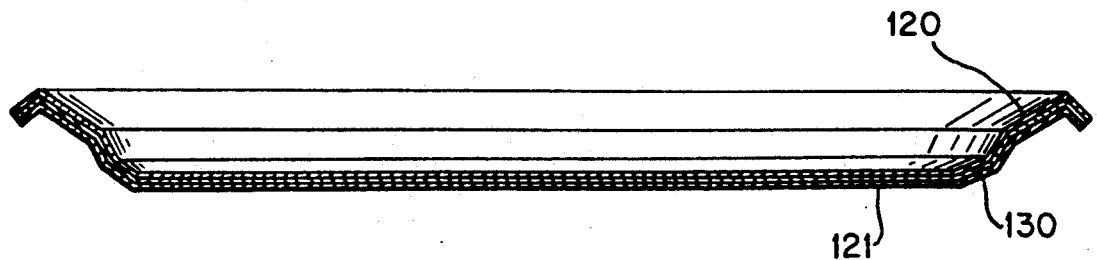
FIG. 3 is a cross-sectional view of an alternative embodiment of the present invention.

With reference to the figures, two thermoformed plates formed in accordance with the present invention are illustrated. FIGS. 1 and 2 illustrate one embodiment of the present invention wherein a film 20 formed in the manner described above has been laminated to sheet 30 and thermoformed into the shape of a plate. FIG. 3 illustrates an alternative embodiment of the present invention wherein sheet 130 is substantially surrounded by an upper barrier film 120 and a lower film 121. According to these illustrated embodiments of the present invention, those skilled in the art will appreciate that foodstuffs placed thereon would not contact the sheet layers during normal use.

Another preferred embodiment of the present invention comprises a sheet having a thickness of about 23 mils formed with about 40% FDA approved talc, about 55% polypropylene homopolymer, and about 5% colorants and stabilizers. The film of this preferred embodiment of the present invention has a thickness of about 2 mils and is formed of a high gloss biaxially oriented polypropylene homopolymer which serves as a cap layer to the first sheet. According to this preferred embodiment, the first sheet is produced using a cast extrusion process and the cap layer is laminated onto the talc filled polypropylene sheet. This preferred embodiment has been found to be particularly suitable for use in forming disposable plates and bowls for consumer use. Plates and bowls formed according to present invention are safer for reheating food, for example in a microwave oven, since the cap layer advantageously serves as a barrier which prevents any undesirable materials in the sheet layer from entering the foodstuffs. Thus the barrier layer of this embodiment of the present invention permits the use of components, such as stabilizers and colorants which are not approved for use with food products, in the sheet layer since those components would not contact the foodstuff during use.

We claim:

1. A thermoplastic multilayer structure comprising: a first extruded sheet capable of thermoforming into end products which comprises a first polyolefin and an inert, inorganic filler material; and
    at least a film comprising a polymer selected from the group consisting of oriented polyolefins and oriented polyesters, joined to said first sheet, whereby sagging is prevented upon thermoforming.

2. A thermoplastic, multilayer structure according to claim 1 wherein said structure is substantially laminar.

3. A thermoplastic, multilayer structure according to claim 2 wherein said film consists essentially of said oriented, polyolefin and said film is laminated to said first sheet.

4. A thermoplastic, multilayer structure according to claim 1 wherein said filler material is selected from the group consisting of talc, calcium carbonate, dolomite, kaolin, gypsum, and mixtures thereof.

5. A thermoplastic, multilayer structure according to claim 1 wherein said first polyolefin comprises polypropylene homopolymer.

6. A thermoplastic, multilayer structure according to claim 5 wherein said oriented polyolefin comprises biaxially oriented polypropylene.

7. A thermoplastic, multilayer structure according to claim 1 wherein said oriented polyolefin comprises biaxially oriented polypropylene.

8. A thermoplastic, multilayer structure according to claim 1 wherein said first sheet comprises about 15-60% of said filler material.

9. A thermoplastic, multilayer structure according to claim 1 wherein said first sheet comprises about 40% talc and at least about 53% polypropylene homopolymer.

10. A thermoplastic, multilayer structure according to claim 9 wherein said oriented polyolefin comprises biaxially oriented polypropylene.

11. A thermoplastic, multilayer structure comprising:
    a first extruded sheet capable of thermoforming into end products which comprises: a first polyolefin; and
    at least a film comprising a polymer selected from the group consisting of an oriented, second polyolefin different from said first polyolefin and an oriented polyester, joined to said first sheet whereby sagging is prevented upon thermoforming.

12. A thermoplastic, multilayer structure according to claim 11 wherein said first sheet comprises an inert, inorganic filler material.

13. A thermoplastic, multilayer structure according to claim 12 wherein said filler material is selected from the group consisting of talc, calcium carbonate, dolomite, kaolin, gypsum, and mixtures thereof.

14. A thermoplastic, multilayer structure according to claim 12 wherein said first sheet comprises about 15-60% of said filler material.

15. A thermoplastic, multilayer structure according to claim 12 wherein said first sheet comprises about 40% talc and at least about 53% polypropylene homopolymer.

16. A thermoplastic, multilayer structure according to claim 15 wherein said oriented, second polyolefin comprises biaxially oriented polypropylene.

17. A thermoplastic, multilayer structure according to claim 11 wherein said structure is substantially laminar.

18. A thermoplastic, multilayer structure according to claim 17 wherein said film consists essentially of said oriented, second polyolefin and said film is laminated to said first sheet.

19. A thermoplastic, multilayer structure according to claim 11 wherein said first polyolefin comprises polypropylene homopolymer.

20. A thermoplastic, multilayer structure according to claim 19 wherein said oriented polyolefin comprises biaxially oriented polypropylene.

21. A thermoplastic, multilayer structure according to claim 11 wherein said oriented polyolefin comprises biaxially oriented polypropylene.

22. A method of forming a multilayer structure comprising:
   forming a first extruded sheet capable of thermoforming into end products which comprises: a first polyolefin and an inert, inorganic filler material;
   forming a film comprising a polymer selected from the group consisting of oriented polyolefins and oriented polyesters; and attaching said first sheet to said film.

23. A method according to claim 22 wherein said structure is laminar.

24. A method according to claim 23 wherein said film consists essentially of said oriented, second polyolefin and said film is laminated to said first sheet.

25. A method according to claim 22 wherein said filler material is selected from the group consisting of talc, calcium carbonate, dolomite, kaolin, gypsum, or mixtures thereof.

26. A method according to claim 22 wherein said first polyolefin comprises polypropylene homopolymer.

27. A method according to claim 26 wherein said oriented, second polyolefin comprises biaxially oriented polypropylene.

28. A method according to claim 22 wherein said oriented, second polyolefin comprises biaxially oriented polypropylene.

29. A method according to claim 22 wherein said first sheet comprises about 15-60% of said filler material.

30. A method structure according to claim 22 wherein said first sheet comprises about 40% talc and at least about 53% polypropylene homopolymer.

31. A method according to claim 30 wherein said oriented, second polyolefin comprises biaxially oriented polypropylene.

32. A method according to claim 22 wherein said sheet has a width greater than 24 inches and a thickness of at least 20 mils.

33. The method according to claim 22 wherein said sheet has a width greater than 45 inches and a thickness of at least 20 mils.

34. A thermoplastic, multilayer structure according to claim 1, wherein said first extruded sheet has a thickness from about 1 to about 50 mils.

35. A thermoplastic, multilayer structure according to claim 34, wherein said first extruded sheet has a thickness of about 25 mils.

36. A thermoplastic, multilayer structure according to claim 1, wherein said film has a thickness from about 0.5 to about 2.5 mils.

37. A thermoplastic, multilayer structure according to claim 36, wherein said film has a thickness from about 1 to about 2 mils.

38. A thermoplastic, multilayer structure comprising:
   a first extruded, nonoriented sheet capable of thermoforming into end products which comprises a first polyolefin and an inert, inorganic filler material; and
   at least a film comprising a polymer selected from the group consisting of oriented polyolefins and oriented polyesters, joined to said first sheet whereby sagging is prevented upon thermoforming.

39. A thermoplastic, multilayer structure comprising:
   a first extruded, nonoriented sheet capable of thermoforming into end products which comprises a first polyolefin; and
   at least a film comprising a polymer selected from the group consisting of an oriented, second polyolefin different from said first polyolefin and an oriented polyester, joined to said first sheet whereby sagging is prevented upon thermoforming.

40. A method of forming a multilayer structure comprising:
   forming a first extruded, nonoriented sheet capable of thermoforming into end products which comprises:
   a first polyolefin and an inert, inorganic filler material;
   forming a film comprising a polymer selected from the group consisting of oriented polyolefins and oriented polyesters; and attaching said first sheet to said film.

* * * * *

UNITED STATES PATENT AND TRADEMARK OFFICE
CERTIFICATE OF CORRECTION

PATENT NO. : 5,204,179
DATED : April 20, 1993
INVENTOR(S) : Baker et al.

It is certified that error appears in the above-identified patent and that said Letters Patent is hereby corrected as shown below:

Col. 4, line 11, delete "substantially"

Col. 4, line 67, delete "substantially"

Signed and Sealed this

Eleventh Day of January, 1994

*Attest:*

BRUCE LEHMAN

*Attesting Officer*   Commissioner of Patents and Trademarks